(12) United States Patent
Malmenstam et al.

(10) Patent No.: US 8,857,849 B2
(45) Date of Patent: Oct. 14, 2014

(54) BRACKET FOR FASTENING OF A CURTAIN AIRBAG TO A VEHICLE PART

(75) Inventors: Jonas Malmenstam, Alingsås (SE); Per Lindberg, Mölndal (SE); Håkan Jaconelli, Alingsås (SE); Atsushi Nakashima, Yokojama (JP); Tetsuya Matsushita, Yokohama (JP)

(73) Assignee: Autoliv Development Ab, Vargarda (SE)

( * ) Notice: Subject to any disclaimer, the term of this patent is extended or adjusted under 35 U.S.C. 154(b) by 0 days.

(21) Appl. No.: 13/879,428

(22) PCT Filed: Sep. 5, 2011

(86) PCT No.: PCT/SE2011/051064
§ 371 (c)(1),
(2), (4) Date: Apr. 15, 2013

(87) PCT Pub. No.: WO2012/053956
PCT Pub. Date: Apr. 26, 2012

(65) Prior Publication Data
US 2013/0214515 A1 Aug. 22, 2013

(30) Foreign Application Priority Data
Oct. 22, 2010 (DE) .......................... 10 2010 049 112

(51) Int. Cl.
*B60R 21/20* (2011.01)
*B60R 21/2338* (2011.01)
*B60R 21/232* (2011.01)
*B60R 21/213* (2011.01)

(52) U.S. Cl.
CPC .............. *B60R 21/20* (2013.01); *B60R 21/232* (2013.01); *B60R 21/2338* (2013.01); *B60R 2021/23386* (2013.01); *B60R 21/213* (2013.01)
USPC ..................................................... 280/728.2

(58) Field of Classification Search
CPC .... B60R 21/20; B60R 21/213; B60R 21/232; B60R 21/2338; B60R 21/217; B60R 2013/0287; B60R 2021/23386; B60R 2022/1818
USPC ........................................................ 280/728.2
See application file for complete search history.

(56) References Cited

U.S. PATENT DOCUMENTS 1,196,087 A * 8/1916 Crume ............................ 24/458
3,774,936 A * 11/1973 Barnett et al. ............. 280/730.1
(Continued)

FOREIGN PATENT DOCUMENTS

DE 102007007781 A1 8/2008
DE 102009022044 A1 12/2009
(Continued)

OTHER PUBLICATIONS

International Search Report and Written Opinion of the ISA for PCT/SE2011/051064, ISA/SE, mailed Feb. 6, 2012.

*Primary Examiner* — Paul N Dickson
*Assistant Examiner* — Timothy Wilhelm
(74) *Attorney, Agent, or Firm* — Harness, Dickey & Pierce, P.L.C.

(57) ABSTRACT

A bracket for fastening a tightening strap of a curtain airbag to a vehicle part includes a base plate and a support surface for fastening the bracket to the vehicle part. A retaining web, fastenable to the tightening strap, is located on the bracket in such a way that the retaining web can be moved to a fastening position by performing a swivel motion with the bracket being supported on the vehicle part via the support surface.

18 Claims, 4 Drawing Sheets

(56) References Cited

U.S. PATENT DOCUMENTS

Figure 1:
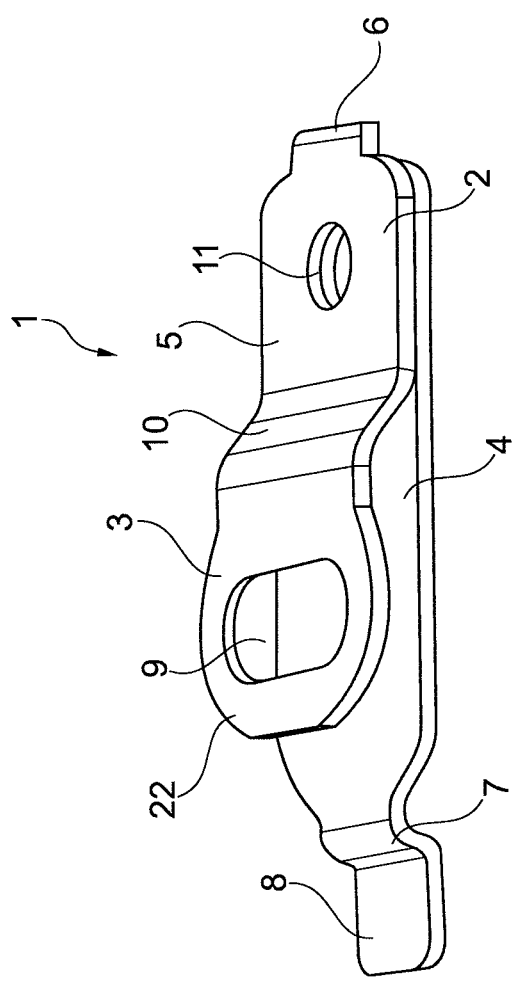

| | | | |
|---|---|---|---|
| 5,372,382 A * | 12/1994 | Whitens | 280/808 |
| 6,848,711 B2 * | 2/2005 | Yamamura et al. | 280/730.2 |
| 7,156,413 B2 * | 1/2007 | Fischer et al. | 280/728.2 |
| 7,172,212 B2 * | 2/2007 | Aoki et al. | 280/730.2 |
| 7,216,891 B2 * | 5/2007 | Biglino | 280/728.2 |
| 7,523,958 B2 | 4/2009 | Jang et al. | |
| 7,571,927 B2 * | 8/2009 | Purvis et al. | 280/728.2 |
| 7,695,000 B2 | 4/2010 | Jang et al. | |
| 7,698,788 B2 * | 4/2010 | Hansen et al. | 24/297 |
| 7,699,339 B2 | 4/2010 | Jang et al. | |
| 7,735,855 B2 | 6/2010 | Jang et al. | |
| 7,823,913 B2 * | 11/2010 | Massot et al. | 280/730.2 |
| 8,480,118 B2 * | 7/2013 | Kjell et al. | 280/728.2 |
| 2005/0029778 A1 * | 2/2005 | Weber et al. | 280/728.2 |
| 2005/0285374 A1 * | 12/2005 | Kawai et al. | 280/728.2 |
| 2011/0316260 A1 | 12/2011 | Jaconelli et al. | |

FOREIGN PATENT DOCUMENTS

| | | |
|---|---|---|
| DE | 102008031880 A1 | 1/2010 |
| EP | 1 502 824 A1 | 2/2005 |
| EP | 1 837 252 A1 | 9/2007 |
| WO | WO 2010/099871 A1 | 9/2010 |

* cited by examiner

BRACKET FOR FASTENING OF A CURTAIN AIRBAG TO A VEHICLE PART

CROSS-REFERENCE TO RELATED APPLICATIONS

This application is a 371 U.S. National Stage of International Application No. PCT/SE2011/051064, filed Sep. 5, 2011. This application claims priority to German Patent Application No. DE 10 2010 049 112.8, filed Oct. 22, 2010. The entire disclosures of the above applications are incorporated by reference herein.

FIELD

The invention relates to a bracket for fastening a tightening strap of a curtain airbag to a vehicle part.

BACKGROUND

Airbags are generally used in vehicles to protect the occupant during an accident and to prevent severe injuries wherever possible. Said airbags are located in different components or vehicle parts and are abruptly inflated at an early stage of the accident, so that they cover the components or the vehicle parts and protect the occupant or the pedestrian against directly hitting certain surfaces of the vehicle interior.

An airbag which is of particular importance for the protection of the occupant is the curtain airbag which is attached above or below the side window structure of the vehicle and, when being inflated, deploys in such a way that in the inflated state it forms a cushion which is located on the side of the head of the occupant. First of all, the curtain airbag prevents the occupant from hitting the side vehicle structure or the side window surfaces with the head or the upper part of the body during an accident owing to the occurring lateral accelerations, and, secondly, it prevents the occupant from being catapulted through an open window out of the vehicle interior to the outside with the head or the upper part of the body. In closed vehicles, the curtain airbag preferably unfolds downwards in a curtain-like manner out of the vehicle structure which delimits the windows at the top side. In cabriolets, the curtain airbag preferably unfolds upwards out of the upper edge of the door. Due to its function, the curtain airbag has a very large surface and, depending on the vehicle type, extends from the A-pillar to the rear C- or D-pillar and thus can have a length of up to 2 to 3 meters. Furthermore, the curtain airbag must cover preferably the whole surface of the vehicle structure located on the side of the upper part of the body and of the head, so that at least in sections it must have a height of 40 to 100 cm. The curtain airbag thus has a very large surface and generally is the largest airbag to be provided in the vehicle.

In order that the curtain airbag, despite its length and its surface, in the inflated state has the required form stability and thereby prevents the occupant from being catapulted out of the vehicle interior, the curtain airbag is fastened to the A- and C- or D-pillar of the vehicle structure preferably in the longitudinal direction of the vehicle using additional tightening straps.

SUMMARY

It is the object of the invention to provide a bracket for a tightening strap of a curtain airbag, which bracket, besides a fastening as easy-to-handle as possible, shall further enable a tensioning of the tightening strap.

For the solution of the object, the invention proposes that a support surface is provided on the bracket for fastening the same to the vehicle part, and that a retaining web is located on the bracket in such a way that the retaining web by performing a swivel motion with the bracket being supported on the vehicle part via the support surface can be moved to the fastening position. Due to the swivel motion of the retaining web the end of the tightening strap held at the retaining web is further moved to a tensioned position with the acting forces being directly introduced into the vehicle part via the provided support surface. Thereby, the bracket is not only used for fastening the tightening strap, but at the same time is used for tensioning the same. By fastening the bracket with the retaining web being in the fastening position the tightening strap is permanently kept tensioned and particularly in the event of the curtain airbag being inflated, so that the curtain airbag when being inflated has an improved form stability and thus an improved restraint effect. Due to the provided support surface the fastening process, despite the additional tensioning movement, is easy to handle without additional tools. Furthermore, the constructional design of the bracket is not complicated thereby, as the reaction forces occurring during the tensioning movement are directly introduced into the vehicle structure via the support surface.

A particularly simple constructional design of the bracket can be realized by the support surface being formed by an angled portion provided at the edge of the base plate. Thereby, the support surface can be formed in a cost-neutral manner while manufacturing the bracket via the shaping of the base plate itself. Provided that the support surface at the same time forms the swivel bearing, around which the retaining web is swiveled, a largest possible swivel radius of the retaining web together with a largest possible tensioning movement with respect to the dimensions of the bracket can be realized by locating the support surface at the edge.

In this case, a further development of the bracket can be seen in that the bracket comprises an engagement portion adjoining the angled portion, with which engagement portion the bracket can be inserted into an opening of the vehicle part, and that the engagement portion is located in such a way relative to the base plate that the engagement portion and the base plate support themselves on different sides of the vehicle part in the position of the bracket being supported on the vehicle part. The engagement portion thereby forms a counter bearing which further fixes the bracket, and, if required, a spring pre-tension can further be exerted on the vehicle part by the bracket owing to a corresponding shaping of the bracket, whereby the clamping force, with which the bracket rests against the vehicle part, can be increased.

It is further proposed that the bracket with one portion is folded back on itself to form a double-layer portion and, in the area of the double-layer portion, can be fastened to the vehicle part using a fastening means, and that the support surface and the retaining web are respectively located at one of the edges of the bracket located on top of each other owing to the folding. Due to the proposed solution the edges of the bracket can be used for realizing the support surface as well as for holding the tightening strap, without the fastening means being covered by the tightening strap and thus being difficult to access. The edges lend themselves for locating the retaining web and the support surface insofar as, by forming a lug, the retaining web and, by shaping the edge correspondingly, the support surface can be realized in a particularly cost-effective and simple constructional manner.

In this case, it is further proposed that the portions located on top of each other owing to the folding in the tensioning direction of the tightening strap have different lengths, and that the retaining web is located on the shorter portion. By locating the support surface on the longer portion, a corresponding distance can be realized between the support surface and the retaining web, which distance, on the one hand, enables a correspondingly larger swivel radius of the retaining web, and, on the other hand, assures that the end of the tightening strap, at least at the beginning of the swivel motion, is held at a distance from the vehicle part which is advantageous for the fastening process.

For this purpose, the retaining web should be located closer to the fastening means than the support surface. Owing to the enlarged distance of the support surface from the fastening means a higher tension force can be exerted on the tightening strap when the bracket is finally fastened due to the lever rule.

It is further proposed that the distance between the portions of the bracket located on top of each other is smaller in the area of the fastening means than in the area of the retaining web. Owing to the larger distance the end of the tightening strap held at the retaining web can be held at a distance from the vehicle part which, in the area of the fastening means, would be disadvantageous for the generation of the required fastening force, so that the distance in this area in the sense of a permanent fastening is chosen to be smaller.

In the ideal case, the portions can rest against each other in the area of the fastening point and they can be spaced in the area of the retaining web.

Alternatively, it is further proposed that the bracket comprises a bracket joint which can be swiveled relative to the base plate in a swivel bearing, and that the retaining web is located on the bracket joint. The proposed solution enables the tightening strap to be tensioned without swiveling the base plate. The base plate thus can be fastened to the vehicle part in a first fastening step, so that during the subsequent swivel motion significantly greater forces are introduced into the vehicle part, namely without the risk of the bracket disengaging from the vehicle part during the tensioning process.

In this case, it is further proposed that the bracket joint comprises an actuating portion, and that the actuating portion is located at a larger distance from the swivel bearing than the retaining web. Due to the actuating portion being located at a larger distance the tension force exerted on the tightening strap due to the lever rules can be increased or the actuating force for a predetermined tension force can be reduced correspondingly.

It is further proposed that the support surface is formed by a fastening element, with which the bracket can be fastened to the vehicle part via the base plate. Thus, a bracket comprising a planar base plate can be used.

DRAWINGS

Figure 2:
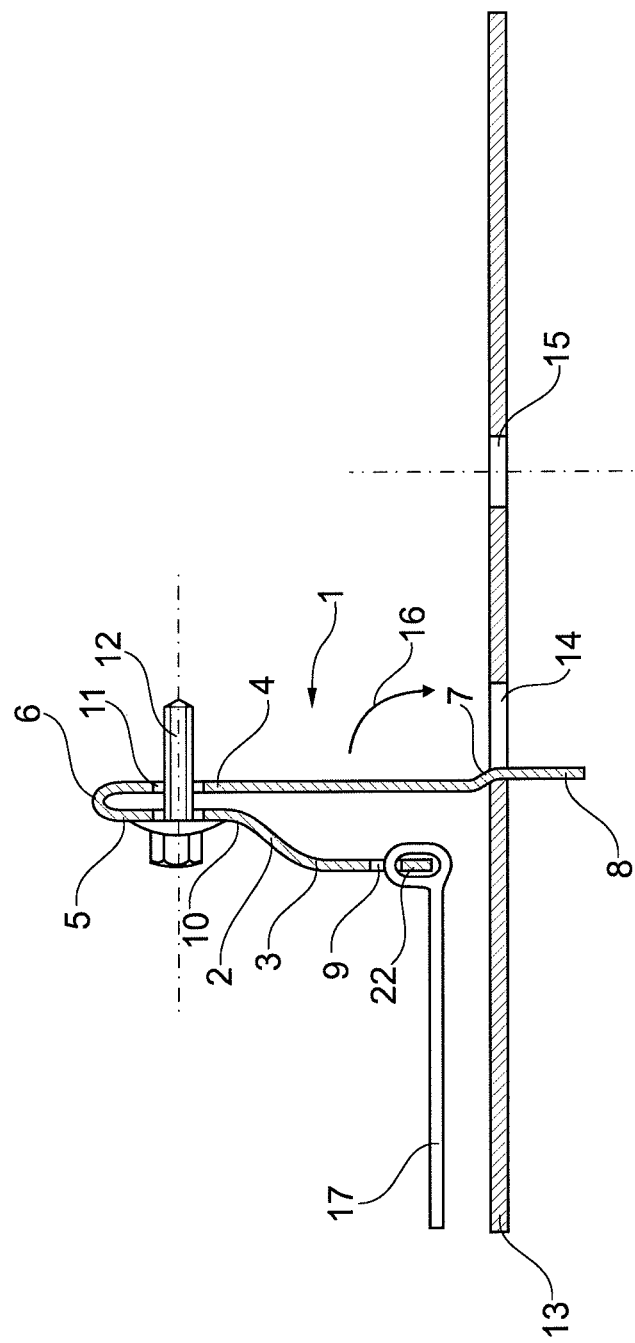
Figure 3:
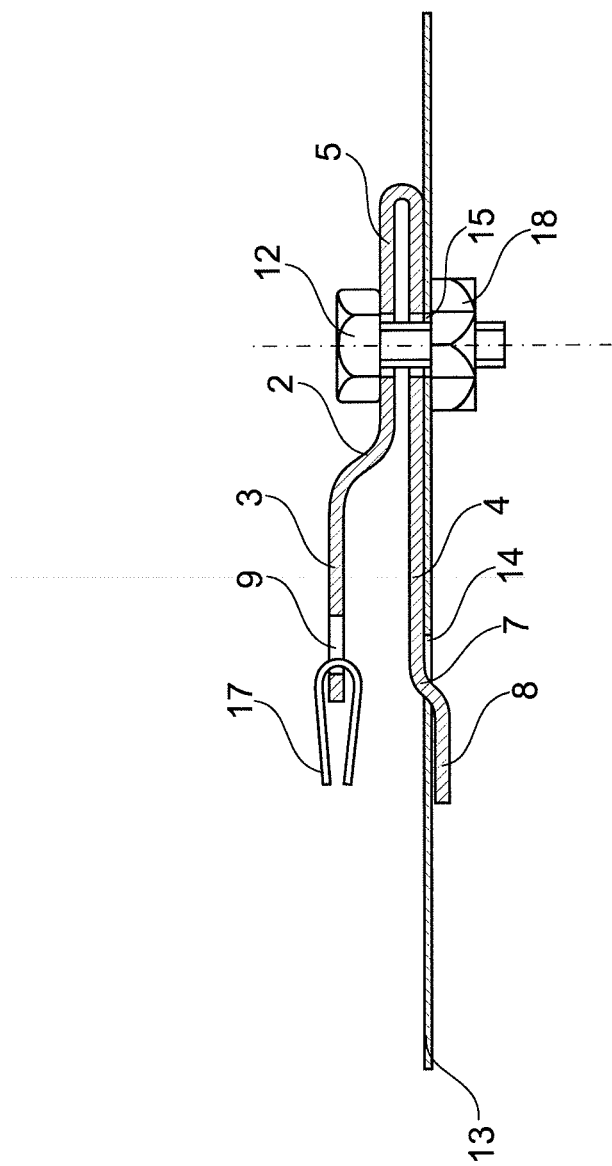
Figure 4:
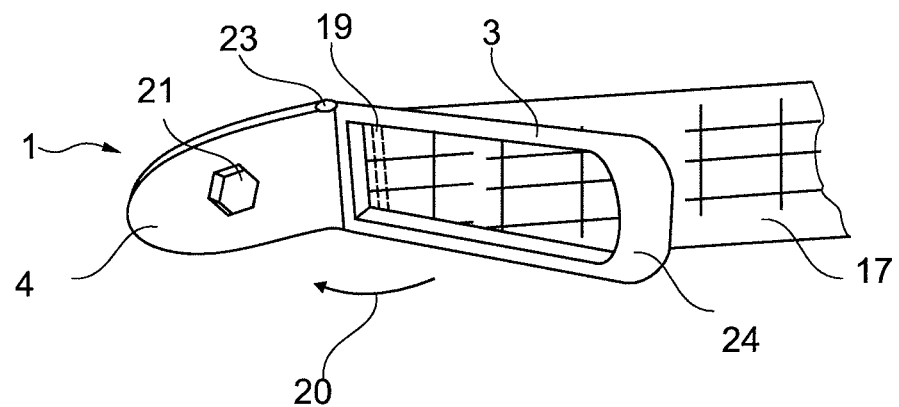
Figure 4:
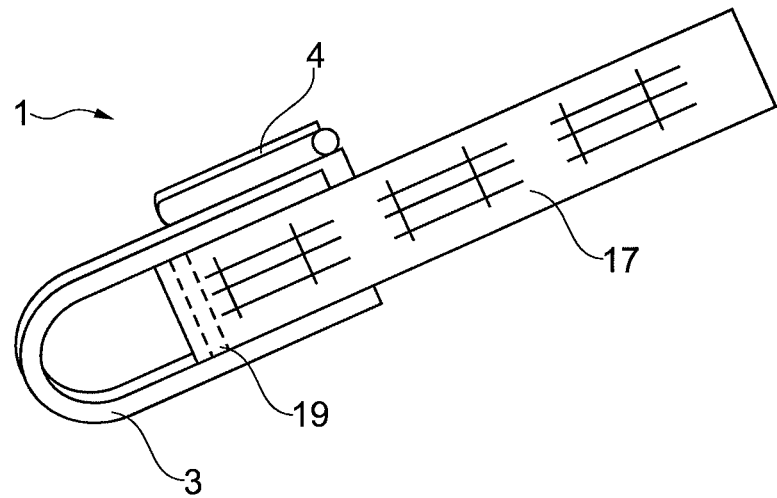

In the following, the invention is described in more detail on the basis of preferred embodiments with reference to the accompanying figures. The figures show in detail:

FIG. 1: Bracket comprising a base plate with one portion being folded back on itself to form a double-layer portion;

FIG. 2: Bracket from FIG. 1 with a tightening strap held thereat at the beginning of the process of mounting the same to a vehicle part;

FIG. 3: Bracket from FIG. 2 in the position of being fastened to the vehicle part;

FIG. 4: Bracket comprising a base plate which can be fastened to a vehicle part and a bracket joint which is swivel-mounted on the base plate and at which a tightening strap is held.

DETAILED DESCRIPTION

FIG. 1 shows a bracket 1 according to the invention made of a stamped metal strip comprising a base plate 4, which bracket in a fold 6 with a portion 2 is folded back on the base plate 4 to form a double-layer portion 5. At first, the double-layer portion 5 is shaped in such a way that the base plate 4 and the portion 2 rest against each other. In this area, the base plate 4 and the portion 2 comprise respective openings which, as a result of the folding process, get to rest on top of each other in an aligned manner and complement each other to form a fastening opening 11. In the further course, the portion 2 of the bracket 1 via a shoulder 10 passes over to a bracket joint 3 which is aligned parallel to the base plate 4 in an offset manner, and in which an opening 9 is provided. By the opening 9 a retaining web 22 is formed at the edge of the portion 2 serving to fasten the tightening strap 17 shown in FIGS. 2 and 3 in a manner guaranteeing tensile strength.

The base plate 4 on the free edge opposite the bracket joint 3 is provided with a support surface 7 which protrudes from the base plate 4 at an angle and is adjoined by an engagement portion 8 which is located parallel to the base plate 4 in an offset manner.

FIGS. 2 and 3 show the bracket 1 with the tightening strap 17 winding around the retaining web 22. For fastening and tensioning the tightening strap 17, the bracket 1 with the engagement portion 8 is inserted into an opening 14 of a vehicle part 13, while the support surface 7 can further be used as an abutment for restricting the insertion movement. The portion 2 of the bracket 1 folded back on the base plate 4 is designed to be significantly shorter than the base plate 4, so that the tightening strap 17 in this position is held at a distance from the vehicle part 13. For fastening the bracket 1 to the vehicle part 13, the bracket 1 in the arrow direction 16 is swiveled from the position shown in FIG. 2 to the position shown in FIG. 3. In the fastening opening 11, a screw 12 is located which, during this swivel motion, owing to the positioning of the fastening opening 11 is "automatically" inserted into a second opening 15 of the vehicle part 13, and is finally fastened there using for example a nut 18.

During this swivel motion, the retaining web 22 and thus the end of the tightening strap 17 fixed thereat as well performs a circular arc-shaped movement, by which the tightening strap 17 is tensioned. The tension forces introduced thereby into the tightening strap 17 are introduced into the vehicle part 13 via the support surface 7. The shorter the portion 2 compared to the base plate 4, the greater the tensioning effect of the tightening strap 17, as hereby the radius of the circular arc-shaped movement causative for the tensioning of the tightening strap 17 can be increased. A further important criterion for the tensioning movement is the distance between the retaining web 22 or the bracket joint 3 from the base plate 4, as the circular arc-shaped radius of the tensioning movement results from the distance between the retaining web 22 and the point of rotation defined by the support surface 7 resting against the edge of the opening 14.

The engagement portion 8 is aligned parallel to the base plate 4 in an offset manner, so that, in the fastening position of the bracket 1, it gets to rest against the rear side of the vehicle part 13, as shown in FIG. 3. The base plate 4 and the engagement portion 8 in the fastening position thus rest against different sides of the vehicle part 13. Thereby, with a corresponding shaping of the bracket 1, it is possible to fix the engagement portion 8 in a spring pre-tensioned manner against the vehicle part 13 by fastening the bracket 1 via the screw 12.

The engagement portion 8 thus serves as an additional clamping surface for fixing the bracket 1 at the vehicle part 13.

The retaining web 22 as well as the support surface 7 are located at the respective edges of the free ends of the bracket 1 resting on top of each other owing to the folding, so that the tightening strap 17 in the final fastening position of the bracket 1 in an assembly-friendly manner does not cover the portion of the bracket 1, on which the fastening opening 11 is provided.

FIG. 4 shows an alternative embodiment of the invention, in which the base plate 4 first via a fastening element 21 in the form of a screw is fastened to a part of the vehicle structure which is not shown. A bracket joint 3 is swivel-mounted on the base plate 4 via a swivel bearing 23, which bracket joint comprises a retaining web 19, at which the tightening strap 17 is held. After the base plate 4 has been fastened, the bracket joint 3 is swiveled in the arrow direction 20 by catching an actuating portion 24, while the retaining web 19 with the same effect as the retaining web 22 in the embodiment of FIGS. 1 to 3 performs a circular arc-shaped tensioning movement and thereby tensions the tightening strap 17.

In this case, the retaining web 19 is located closer to the swivel bearing 23 than the actuating portion 24, so that the tension force exerted on the tightening strap 17 due to the lever rules can be increased or the actuating force can be reduced at an equal tension force.

In this embodiment, the support surface 7 from the embodiment shown in the FIGS. 1 to 3 is realized by the fastening element 21, via which the reaction forces acting during the tensioning process are introduced into the vehicle structure. Screws, clip elements or rivets are possible fastening elements 21. Alternatively or additionally, the reaction forces may also be introduced into the vehicle structure via a shaping of the base plate 4 by the base plate 4 being located in a non-displaceable manner on the vehicle part in an opening or a recess. In this case, the support surface 7 would be integrally formed directly to the base plate 4, as is realized in the embodiment of the FIGS. 1 to 3.

The invention claimed is:

1. A bracket for fastening a tightening strap of a curtain airbag to a vehicle part, the bracket comprising:
    a base plate operable for fastening the bracket to the vehicle part;
    a support surface provided on the bracket for fastening the bracket to the vehicle part; and
    a retaining web for attachment to the tightening strap, the retaining web movable to a fastening position by performing a swivel motion with the bracket being supported on the vehicle part via the support surface;
    wherein a first portion of the bracket is folded back on the base plate to form a double-layer portion, and, in an area of the double-layer portion, the bracket defines a fastener opening for receiving a fastener completely through the double-layer portion, and wherein the support surface and the retaining web are respectively located at a first end and a second end of the bracket located on top of each other due to the folding, and;
    wherein the bracket is constructed of a metal strip continuously extending from the first end to the second end.

2. The bracket according to claim 1, wherein the support surface is formed by an angled portion provided at an end of the base plate.

3. The bracket according to claim 2, wherein the bracket further includes an engagement portion adjoining the angled portion, the engagement portion of the bracket insertable into an opening of the vehicle part and located relative to the base plate such that the engagement portion and the base plate support themselves on different sides of the vehicle part in a position of the bracket being supported on the vehicle part.

4. The bracket according to claim 1, wherein the second end is shorter than the first end.

5. The bracket according to claim 1, wherein the retaining web is located a first distance from the fastener opening and the support surface is located a second distance from the fastener opening, the first distance less than the second distance.

6. The bracket according to claim 1, wherein a distance between the first portion and the base plate in the double-layer portion is smaller than a distance between the retaining web and the support surface.

7. The bracket according to claim 6, wherein the first portion rests against the base plate in an area of the fastener opening.

8. The bracket according to claim 1, wherein the bracket comprises a bracket joint which can be swiveled relative to the base plate in a swivel bearing, and the retaining web is located on the bracket joint.

9. The bracket according to claim 8, wherein the bracket joint comprises an actuating portion located at a larger distance from the swivel bearing than the retaining web.

10. The bracket according to claim 8, wherein the support surface is formed by a fastening element, with which the bracket can be fastened to the vehicle part via the base plate.

11. The bracket according to claim 1, wherein the metal strip continuously extending from the first end of the bracket to the second end of the bracket.

12. The bracket according to claim 11, wherein the first end is parallel to the second end.

13. A bracket for fastening a tightening strap of a curtain airbag to a vehicle part, the bracket comprising:
    a base plate operable for fastening the bracket to the vehicle part;
    a first end for passing through an opening in the vehicle part; and
    a second end for attachment to the tightening strap; and
    a first portion of the bracket folded back on the base plate to form a double-layer portion, the double-layer portion defining a fastener opening extending through both the first portion and the base plate, the fastener opening for receiving a fastener,
    wherein the bracket is constructed of a metal strip continuously extending from the first end to the second end.

14. The bracket according to claim 13, wherein the first end defines a support surface about which the bracket is pivotable when the bracket is moved to a fastening position.

15. The bracket according to claim 14, wherein the second end defines a retaining web, the retaining web and the base plate located on top of each other due to folding of the bracket.

16. A bracket for fastening a tightening strap of a curtain airbag to a vehicle part in combination with the tightening strap and the vehicle part, the bracket comprising:
    a base plate operable for fastening the bracket to the vehicle part;
    a first end for passing through an opening in the vehicle part;
    a second end for attachment to the tightening strap;
    a first portion of the bracket folded back on the base plate to form a double-layer portion, the double-layer portion defining a fastener opening extending through both the first portion and the base plate; and
    a fastener passing completely through the fastener opening and securing the bracket to the vehicle part,
    wherein the bracket is constructed of a metal strip continuously extending from a first end to a second end.

17. The bracket according to claim 16, wherein upon fastening the bracket to the vehicle part, the first end is adjacent a first side of the vehicle part and the base plate is adjacent to a second, opposite side of the vehicle part.

18. The bracket according to claim 16, wherein the second end is parallel to and spaced from the base plate.

* * * * *